(12) United States Patent
    Cardano et al.

(10) Patent No.: US 10,017,201 B2
(45) Date of Patent: Jul. 10, 2018

(54) CONTROL SYSTEM OF A SELF-MOVING CART, IN PARTICULAR A GOLF CADDIE

(71) Applicant: KADDYMATIC INC., Santa Clara, CA (US)

(72) Inventors: Matteo Cardano, Novara (IT); Domenico Guida, Novara (IT)

(73) Assignee: TECNEVA S.R.L., Novara (IT)

( * ) Notice: Subject to any disclaimer, the term of this patent is extended or adjusted under 35 U.S.C. 154(b) by 0 days.

(21) Appl. No.: 15/118,731

(22) PCT Filed: Feb. 11, 2015

(86) PCT No.: PCT/IB2015/051012
§ 371 (c)(1),
(2) Date: Aug. 12, 2016

(87) PCT Pub. No.: WO2015/121797
PCT Pub. Date: Aug. 20, 2015

(65) Prior Publication Data
US 2017/0050659 A1    Feb. 23, 2017

(30) Foreign Application Priority Data
Feb. 12, 2014    (IT) .............................. MI2014A0198

(51) Int. Cl.
*B65B 3/12*    (2006.01)
*B62B 5/00*    (2006.01)
(Continued)

(52) U.S. Cl.
CPC .............. *B62B 5/0069* (2013.01); *B62B 3/12* (2013.01); *B62B 5/0036* (2013.01);
(Continued)

(58) Field of Classification Search
CPC ............ G05D 1/02; B62D 1/24; B62D 51/04
USPC ......... 701/2; 180/167, 19.1, 19.2, 65.1, 209, 180/907, 220; 318/139, 432, 504, 581
See application file for complete search history.

(56) References Cited

U.S. PATENT DOCUMENTS 5,350,982 A * 9/1994 Seib .................... B60L 11/1805
                                                           280/DIG. 5
5,657,828 A * 8/1997 Nagamachi ......... B60L 11/1805
                                                           180/168
(Continued)

FOREIGN PATENT DOCUMENTS

DE    202005013177    12/2005
FR       2868560       7/2005

*Primary Examiner* — Thomas G Black
*Assistant Examiner* — Wae L Louie
(74) *Attorney, Agent, or Firm* — Bay State IP, LLC

(57) ABSTRACT

A control apparatus for a self-moving cart is disclosed, in particular a golf caddy, comprising at least a speed control of a motor onboard the cart and a logical control unit which adjusts said speed control of said motor based on the relative position of a reference user, furthermore comprising a proximity detection device meant to face the rear side of the cart, with respect to the travelling direction, so as to detect a relative distance with respect to a user following the cart, said logical control unit being configured so as to determine said speed control depending on said detected relative distance so that it is maintained in a tolerance range defined by a maximum distance and a minimum distance, wherein said minimum distance is such as to enable the user to operatively reach on/off means of said apparatus meant to be installed onboard said cart.

13 Claims, 9 Drawing Sheets

(51) Int. Cl.
*B62B 3/12* (2006.01)
*B62D 5/04* (2006.01)
*G05D 1/00* (2006.01)
*G05D 1/02* (2006.01)

(52) U.S. Cl.
CPC ............ *B62B 5/0076* (2013.01); *B62D 5/046* (2013.01); *G05D 1/0088* (2013.01); *G05D 1/0231* (2013.01); *B62B 2202/404* (2013.01); *G05D 2201/0204* (2013.01)

(56) References Cited

U.S. PATENT DOCUMENTS

| | | | | |
|---|---|---|---|---|
| 7,086,491 | B2* | 8/2006 | Matte | A61G 5/042 |
| | | | | 180/21 |
| 7,293,619 | B2* | 11/2007 | Mitchell, Jr. | B62B 3/001 |
| | | | | 180/19.2 |
| 8,573,338 | B2* | 11/2013 | Gal | A63B 55/087 |
| | | | | 180/19.1 |
| 9,706,706 | B2* | 7/2017 | Barendrecht | A01D 34/006 |
| 2010/0168934 | A1* | 7/2010 | Ball | G05D 1/0242 |
| | | | | 701/2 |
| 2010/0241290 | A1* | 9/2010 | Doane | G05D 1/028 |
| | | | | 701/2 |
| 2014/0062241 | A1* | 3/2014 | Evans | H02K 49/108 |
| | | | | 310/103 |
| 2014/0107868 | A1* | 4/2014 | DiGiacomcantonio | A45C 5/14 |
| | | | | 701/2 |
| 2015/0327638 | A1* | 11/2015 | Ghosh | A45C 5/14 |
| | | | | 180/167 |
| 2016/0081267 | A1* | 3/2016 | Barendrecht | A01D 34/824 |
| | | | | 701/22 |

* cited by examiner

CONTROL SYSTEM OF A SELF-MOVING CART, IN PARTICULAR A GOLF CADDIE

CROSS REFERENCE TO RELATED APPLICATION

This application is for entry into the U.S. National Phase under § 371 for International Application No. PCT/IB2015/051012 having an international filing date of Feb. 11, 2015, and from which priority is claimed under all applicable sections of Title 35 of the United States Code including, but not limited to, Sections 120, 363, and 365(c), and which in turn claims priority under 35 USC 119 to Italian Patent Application No. MI2014A000198 filed on Feb. 12, 2014.

FIELD OF THE INVENTION

The present invention relates to self-moving carts, in particular caddies for golf bags.

BACKGROUND ART

Self-moving carts are known, provided with small independent motors (electric-battery motors, small combustion engines, . . . ), which are employed for transporting objects or work/sport equipment on rough terrain, in the presence of an operator who walks alongside controlling speed and direction thereof. A particularly widespread application, on which the following description will be mainly based, is that of golf caddies, that is electric-drive caddies for transporting golf bags.

Golf caddies are normally provided with three or four support wheels, of which the driving one/s are controlled by one or two (in order to have two independent motor shafts) battery-powered electric motors. These caddies are conceived to save the golf player from carrying on his/her shoulder his/her bag containing the clubs and all the items required for playing (balls, tee, . . . ), which may weigh up to 20 kilograms, along the various kilometers which are walked when completing a golf game.

Although motorless carts also exist, self-moving ones have an undeniable advantage, as they save the golf-player from the effort of pushing or dragging the cart on usually rough and sometimes muddy and irregular playing fields.

The self-moving golf caddie is essential for people who would not be strong enough to carry along or push the golf bag and in any case it is very useful also for those who would have the physical strength but who can save energies for the game.

However, the provision of a drive on golf carts implies various problems. One of the most significant ones is that of adjusting the caddy speed to adapt it to that of the moving player, in particular because he/she continuously accelerates, slows down and stops on the golf course, both to play when it is his/her turn, and to wait for game companions when it is their turn.

In substance, as it can be guessed, a significant problem of self-moving carts is that of causing them to follow the movements of the respective player in as regular a way as possible.

A first type of known cart, of a simpler and cheaper construction, provides a manual control device arranged on the guiding handle. Thereby, the player always maintains contact with the caddy handle, which enables him/her to guide the movement direction, so he/she can simultaneously act on the controls which are mounted on the handle, within easy reach. In this case, the control device comprises at least a switch, to switch the motor on and off, and a speed adjuster, usually in the shape of a small wheel or other mechanical device which acts on motor speed.

This solution is inexpensive and reliable, also because the player always maintains caddy guidance, but the adjuster requires continuous and meticulous handling, to adapt the caddy pace to the player's, which is at least inconvenient. Moreover, in case a mistake is made in adjusting the speed (humidity may cause contact with the adjuster to become slippery) or contact with the caddy is lost (for example due to a snag), caddy control may be lost, with the risk of damaging the golf course or the equipment.

Summing up, this control mode causes an unpleasant distraction to the player and problems for the speed setting and possibly for the direction to be imparted to the caddy, which must be continuously manually adjusted.

As electronics costs and dimensions drop and as the calculation power of electronic circuit boards increases, it has been possible to offer semi-automatic or fully automatic golf caddies; they solve the problems set forth above, moving independently on the ground, without physical contact being required between the player and the caddy and without the player having to actively set the caddy speed.

All the solutions known so far start from the approach that the cart must follow the player during his/her movements on the golf course. Therefore, the control system provides a receiver/transmitter, two-unit apparatus, partly mounted onboard the cart and partly carried by the player. The two units exchange signals transmitted through the air (on various wavelengths and with various powers, depending on the circumstances) so that the relative position thereof may be determined and a control may be sent to the cart drive to follow the unit which the player carries with him/her. Examples of these known systems are described in U.S. Pat. No. 3,742,507, U.S. Pat. No. 3,472,333, U.S. Pat. No. 3,812,929, U.S. Pat. No. 4,844,493, U.S. Pat. No. 5,611,406, U.S. Pat. No. 5,711,388, WO201359423, EP2021823.

In some cases it is also resorted to a player's position signal detected with GPS technology.

However, all these solutions, in which the cart follows the player, imply a variety of problems:

a. the transmission system and the track-and-follow logic is expensive to accomplish and necessarily requires an electro-mechanic steering system or double motor for changing direction, because the cart is independent and must be able to steer automatically;

b. the control system is not applicable to existing manual carts, but at a higher cost than the cart itself;

c. The player is forced to carry with him/her a control unit which identifies him/her univocally, to allow the cart to follow the correct player; the individual portable units must hence be always maintained with the relative cart or preliminary programming to the use of the cart must be made by the user, which is certainly a problem in large golf clubs (where a plurality of carts are always kept at the players' disposal);

d. cart independence may lead it to go through not-allowed areas (such as the greens and the bunkers), narrow passages (small bridges, bottlenecks, . . . ) or bumpy paths (potholes, soft ground, . . . ), with the imaginable consequences;

e. the following distance, with which these systems work best, may cause the cart trajectory to intercept obstacles or other players;

f. if the cart stops due to an obstacle (a rock, a ditch, yielding ground, . . . ), the player does not realise it immediately and may walk away by a fair distance before having to walk back to collect the equipment.

Other proposed solutions for directing and moving golf carts at controlled speed provide to act with a traditional remote "guiding" system, that is, through a remote control (see for example U.S. Pat. Nos. 3,472,333, 3,720,281, 3,742,507, 3,812,929, 3,856,104, 3,976,151 and 4,109,186). In this case some of the problems illustrated above are solved, but the further problem of the difficulty of use is introduced.

Another disadvantage which all these track-and-follow or remote-control systems share is the fact that the user no longer comes into physical contact with the cart during the movement thereof. That fully removes a possible dragging effect, which some player has learnt to exploit, that is, the opportunity of being partly dragged by the cart, using the traction power of the wheels, especially when raised sloping areas must be approached.

An alternative consists in carts provided with proximity sensors facing towards the rear travelling side, that are moving preceding the player who follows. An example of these technical solutions is disclosed in FR2868560.

However, the control mode of the known solutions is not satisfactory yet. In particular, the use of some types of sensors does not provide a fully reliable signal, which makes these systems virtually unusable in practice.

Firstly, in order to propose a commercially acceptable system, it is necessary to employ modestly-priced sensors, which intrinsically provide signals subject to errors and disturbances; since cart control is rather critical, in order to be able to precede in a regular way the player at a short distance, any assessment mistake may lead to an unpleasant dynamic behaviour. In particular, prior-art systems are subject to control instability (elastic effect) which prevent the cart from synchronising with the player's speed.

Moreover, operation limits exist linked to the nature of the sensors.

For example, when the sensor is of the sonar type (that is, ultrasound), false readings may occur in case of strong wind, ice, dust, and/or high-pitched background sounds, which may gripper the uncontrolled start of the cart (safety problems). Moreover, when the user wears sound-absorbing garments (such as sponge-like piles or thick woolen jumpers, the sonar sensor does not correctly detect the distance and the cart does not move at all or very irregularly (movement smoothness problems). If the garments are loose or not perfectly perpendicular to the sensor, the sensor may detect measurements which differ up to 10 cm from the actual one. Finally, should the user move only his/her hand close to grab the cart handle, the ultrasound sensor may detect a general sudden approaching of the player and suddenly accelerate cart speed in an undesired manner.

When instead the sensor is of the infrared type, false readings easily take place depending on the temperature of the surrounding objects; on golf courses, outdoors, it is very likely that an infrared sensor is hit and saturated by direct sunlight, which produces an incorrect signal and imposes undesired movements to the cart.

SUMMARY OF THE INVENTION

The object of the present invention is hence that of providing a structurally and conceptually simple control system for a self-moving cart, suitable to be installed also on existing carts and especially devoid of the control problems set forth above.

In particular, it is wished to provide a control system which determines a smooth and regular operation of the cart, which operates correctly with any garment (more or less sound-absorbing, but also loose ones) and any weather condition and which guarantees a high level of control safety (that is, it must not start if there is not really a person in close proximity).

Such objects are achieved through a device as described in its essential features in the attached claims.

According to a first aspect of the invention, a control apparatus for a self-moving cart is provided, comprising at least a speed control of a motor onboard the cart and a logic control unit which adjusts said speed control of said motor according to the relative position of a reference user, furthermore comprising a proximity detecting device facing the rear side of the cart, with respect to the travelling direction, so as to detect a relative distance to a user who follows the cart, said logic control unit being configured so as to determine said speed control depending on said detected relative distance so that it is maintained in a tolerance range defined by a maximum distance and a minimum distance, wherein said minimum distance is such as to enable the user to operatively reach activation/deactivation means of said apparatus meant to be installed onboard said cart, characterised in that said logic control unit controls said motor acting on increase and decrease of a "basic power" of the motor, in a typical time, function of said detected relative distance and function of the absolute travelling speed, increase and decrease of a "temporary power" which is inversely proportional to said detected relative distance, said basic power being of a value of the magnitude order of the power absorbed by the cart movement frictions, while said temporary power being of the magnitude order of the power absorbed by the cart acceleration inertias.

According to another aspect, said logic control unit controls said motor so as to maintain said basic power as a percentage of the temporary power after a preset period of continuous time has elapsed in which said detected relative distance lies in a "adjacent area" range.

According to a further aspect, variations of said increases/decreases are calculated cyclically with a minimum time interval of 3 tenths of a second and at most of 1 second and they are in the order of 2% to 5%.

According to a further singular aspect of the invention, said proximity detector device has at least one detector provided with two different-type sensors, arranged at close distance and calibrated so as to provide substantially equal detected relative distance signals in a condition of average distance between the cart and a user, the signals of said two sensors being compared by said logic control unit to check the consistency thereof at least in the apparatus start-up step.

Preferably, said control unit controls said motor at the start of said apparatus only if both said two sensors detect for at least two consecutive calculation cycles that (i) said detected relative distance lies in the range of an average distance, (ii) the signals detected by the two sensors provide measurements within a certain maximum tolerance and (iii) the last relative distance detection measurement has a difference compared to the previous one which falls in a preset admissibility range.

According to another aspect, during regime movement, said control unit performs the control action as a function only on the signal of a first one of said two sensors, provided the signals of said two sensors are consistent and plausible, while—if the signal of the first sensor is incorrect—it performs the control action as a function of the signal of said second sensor, provided it is plausible with the signal of the previous cycle.

Said two sensors are an ultrasound one and an infrared or laser one.

According to a further aspect, said proximity detector device has a single distance detector according to a single detection axis. Alternatively, said proximity detector device has two distance detectors according to two distinct detection axes arranged at a distance on a transversal direction with respect to a travelling direction. In this case, steering means are furthermore provided, controlled by said logic control unit depending on the difference between the signals detected by said two distance detectors.

Preferably, said steering means are embedded in said motor which has two independent transmission axes for two opposite drive wheels. According to a further preferred variant, the apparatus furthermore has an inclinometer which provides an inclination value to said logic control unit, this last one defining the control of said motor based on a map of reference values which comprise said detected relative distance and said inclination value.

According to a different aspect of the invention, it is provided a self-moving golf caddy, comprising at least a support frame, an assembly of at least partly-driving tricycle or quadricycle wheels, a motor to drive said driving wheels and a control apparatus for adjusting the control of said motor depending on the relative position between said caddy and a user, wherein said control apparatus is as described here above.

BRIEF DESCRIPTION OF THE DRAWINGS

Further features and advantages of the system and of the cart according to the invention will in any case be more evident from the following detailed description of preferred embodiments, given as an example and illustrated in the attached drawings, wherein.

DETAILED DESCRIPTION OF PREFERRED EMBODIMENTS OF THE INVENTION

In the following description, non-limiting reference will be made to a self-moving golf caddy, which is the most advantageous application of the system of the invention; however, it is not ruled out that also other types of self-moving carts (for transporting work objects and/or equipment such as for example lawnmowers, transpallets, shopping carts, fork lifts, . . . ) may benefit from the teachings supplied here.

A golf cart traditionally comprises a support frame 1 provided below with a series of wheels 2 in a tricycle or quadricycle configuration. On the support frame a bag for golf equipment (clubs, balls, . . . ) is found. Support frame 1 ends above with a handle 3, by which the player can handle the cart, then push it or pull it towards himself/herself and direct the movement direction thereof.

Figure 5:
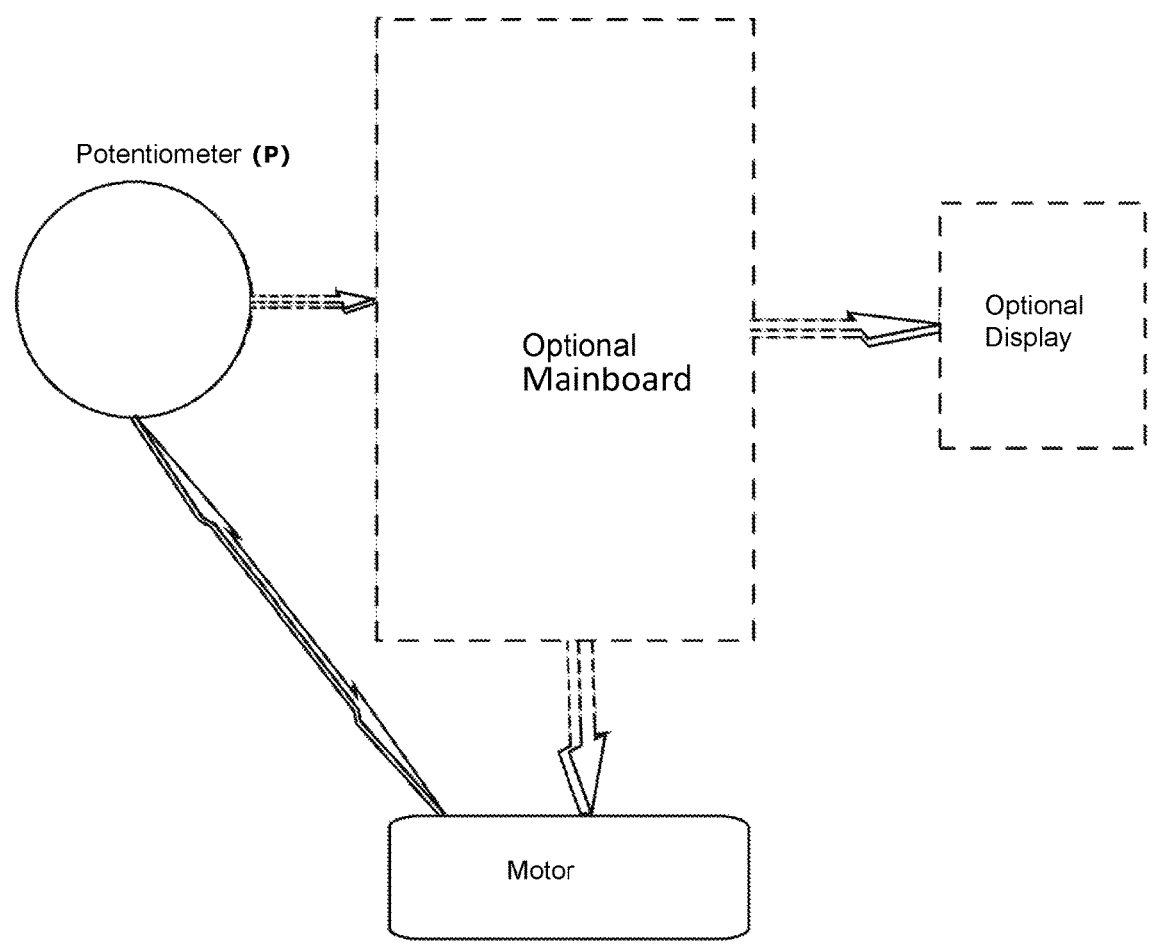
FIG. 5 is a schematic view which illustrates the logical connections of a prior-art control system.

The frame 1 of the self-moving cart furthermore carries a motor M, typically in the shape of one or more battery-powered electric motors, connected to the driving wheels. Motor M is suitably controlled at speed through an adjustment device, for example, a potentiometer P (FIG. 5) which acts analogically on the current supplied to the motor, or through an electronic circuit board which transforms a speed adjuster signal into digital impulses for driving the motor.

Next to or as a replacement of the existing adjustment device, according to the invention an intelligent control system is provided, provided with a proximity detection device 4 and with a logical unit on which a suitable control algorithm is implemented for defining and sending corresponding control signals of motor M.

Proximity device 4 is mounted integral with the cart frame and faces towards the rear side (with reference to the travelling direction), so as to detect the player/user's presence and determine the distance between the player and the rear part of the cart.

Proximity detection device 4, together with a possible on/off switch 5, is advantageously (even though it is not limiting) installed on handle 3, so as to be at an ideal height for "framing" the player and comfortably reachable by the player himself/herself.

Figure 9:
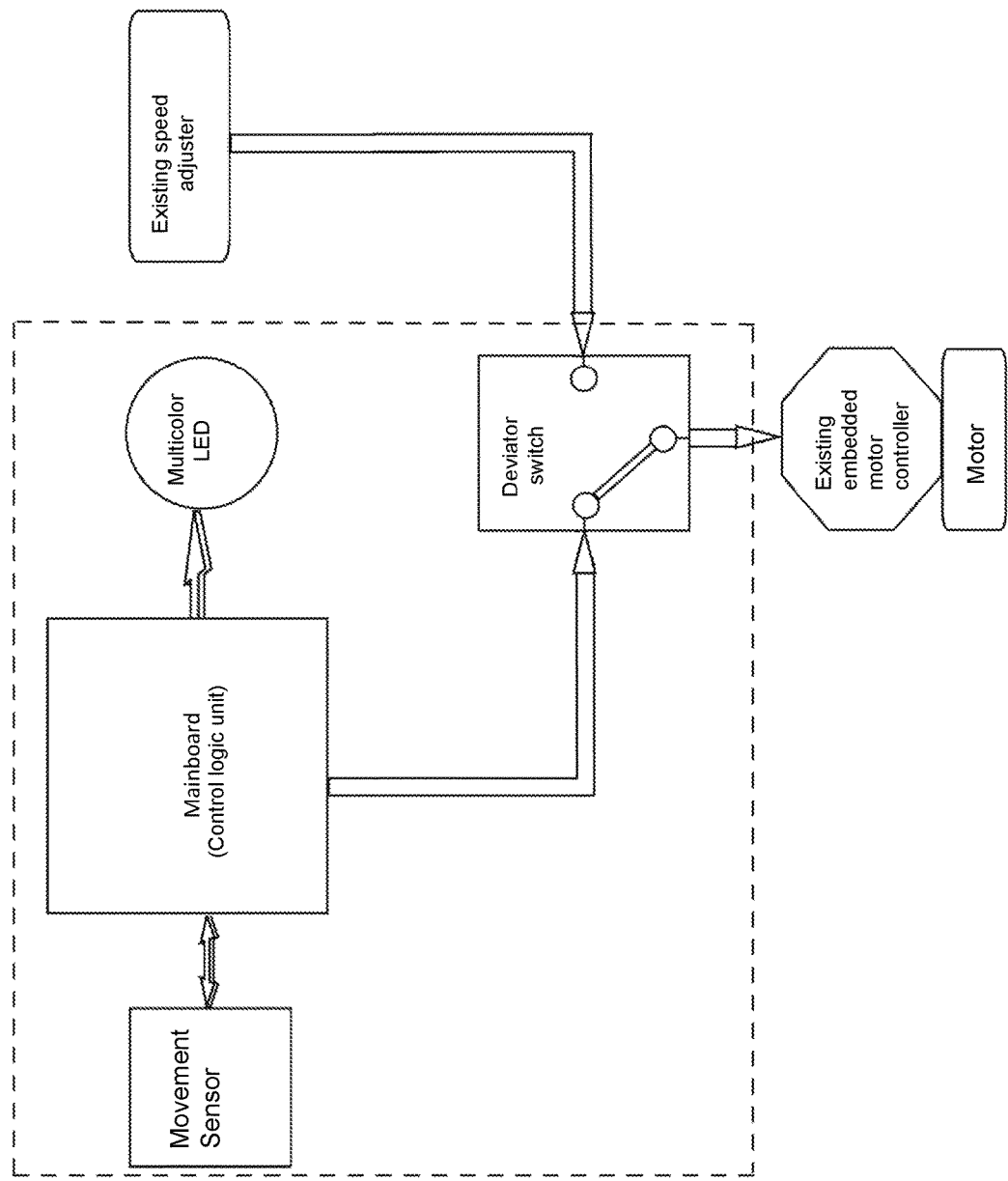
FIG. 9 is a schematic view which shows the logical connections of an apparatus according to the invention inserted in an existing cart.

Should the control system of the invention to be installed on an existing cart, it is possible to prepare the integrated control system onto a single apparatus, consisting of proximity detection device 4, logical control unit and an on/off deviator switch, which can be inserted simply upstream of the existing speed adjuster, so as to exclude said adjuster and insert into the existing circuit the desired control signal for motor M (see also FIG. 9). In particular, the apparatus can be easily connected since, in most existing carts, speed variation occurs as the resistance (or the voltage) at the input of the electronic device controlling motor power varies. Generally a linear increase of resistance (or of voltage) is matched by a linear increase of motor speed.

The electric supply of the apparatus, for operating the sensors and the electronic circuit board for signal processing, is supplied by the battery itself which supplies the electric motor or by auxiliary batteries (typical standard stylus batteries).

A first variant of the system provides a proximity detection device 4 comprising a single detector, consisting of a transmitter and relative receiver (which will be described in greater detail further on), which issues a signal and detects the corresponding return signal, once it has been reflected by the player (or by a reflecting but passive object worn by the player) which is found behind the cart, for example on the centre-line axis of the same.

The logical unit is configured so as to determine the distance between a reference point of the cart, for example the rear end of handle 3, and the following player, and to control as a result motor M so as to keep this detected distance in a preset range.

The system is designed to continuously and periodically acquire, with a typical cycle pace (for example lasting 6-7 tenths of a second), the distance of the player following the cart, through a proximity detection sensor which is simply capable of detecting a distance from a person following at less than 50 cm and with an approximation of a few centimeters (for example 3 cm maximum approximation); such a detector may be, by its nature, little precise and non-directional, hence simple, light and therefore very inexpensive.

When the control system detects that the user is approaching the cart, it acts by sending impulses to the speed adjustment of the motor, similarly to what a classic mechanical system would do; when the user moves away, the system reduces the speed and possibly stops the motor, if necessary also acting on the brakes (if provided).

Figure 3:
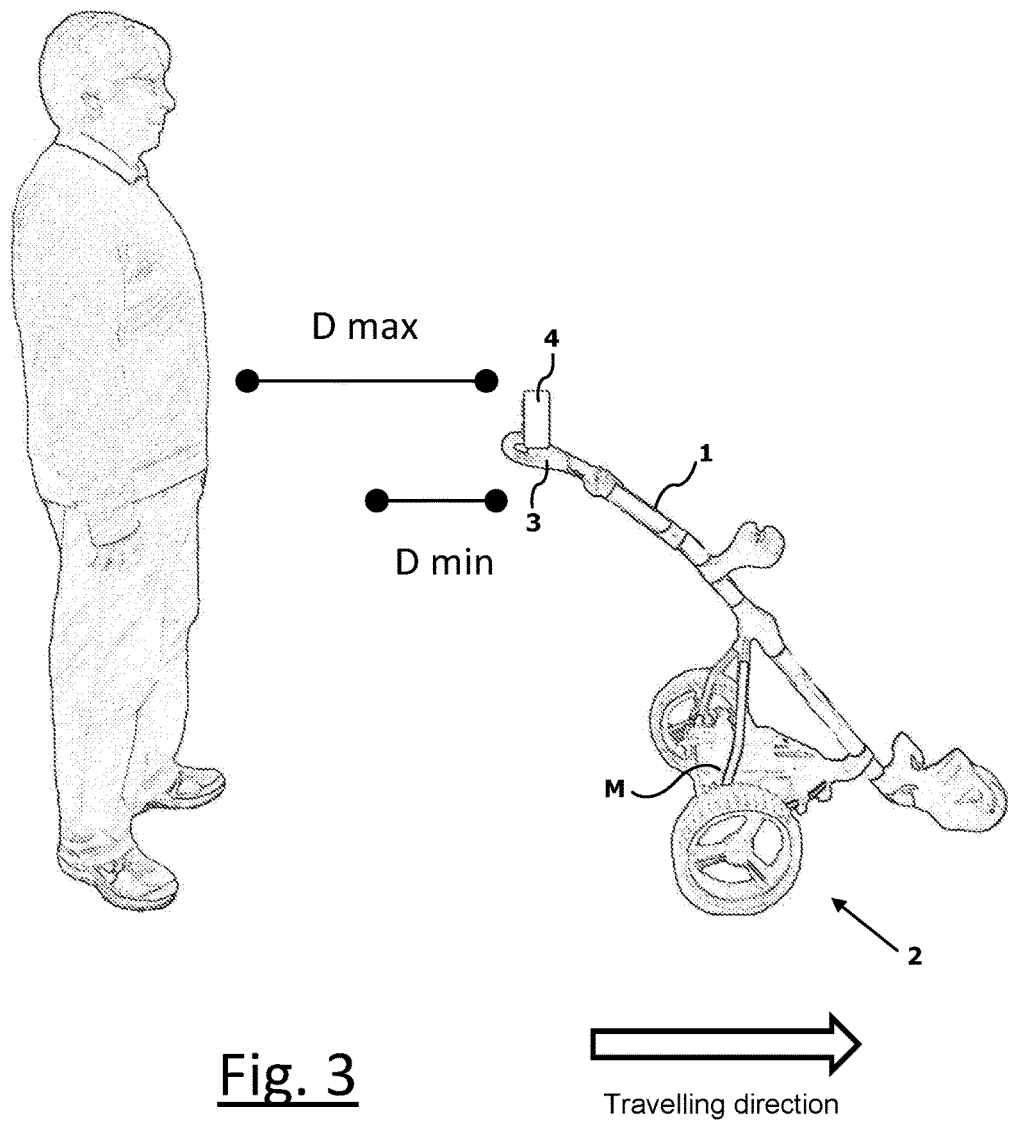
FIG. 3 is a pictorial view which illustrates the driving mode of a golf cart equipped with the system according to the invention.

The preset admissible distance range is defined by limits Dmax and Dmin, where Dmax is the maximum tolerable distance and Dmin is the minimum tolerable distance (FIG. 3).

The Dmax-Dmin range of tolerable distances between cart and player is defined, also based on the starting torque capacity of motor M, so that the player may in any case approach the cart reaching handle 3 with a stretched-out arm, possibly with a sudden acceleration of his/her pace. That guarantees the player to be able to grab the cart handle at any time and to manually determine the driving thereof or to act on the manual controls of the control system. It must furthermore be noticed that the player is thereby allowed to remain fastened to the handle and to have himself partly dragged by the driving force of the wheels thereof.

Due to this operating range of the system, automatic cart stopping is also obtained as soon as the player stops and the maximum tolerable distance Dmax is exceeded. That implies inherent system safety, because in case of the player stopping, the cart automatically stops and there is no risk of it uncontrolledly continuing its travel.

Thereby a cart is obtained which moves independently, automatically adjusting the speed thereof in sync with the walking pace (accelerations, decelerations, stops included) of the player following it. The player can walk freely at the speed he/she prefers, without worrying about having to interact with the cart to cause it to move or to stop, but maintaining a close distance and relationship therewith.

In order to increase cart behaviour safety, the control system is furthermore provided with an inclinometer, which provides a signal relating to cart attitude. The signal detected through the inclinometer, weighted according to the instant speed of the cart or, better, based on the acceleration vector (detected for example through an accelerometer), provides a measure of the instability level of the cart. In the data processing unit a mapping of reference data is arranged which defines a "control area", rather than a simple control of the single quantity: through the control area it is possible to determine a speed adjustment also according to the detected inclination/acceleration values, setting limits to the control on the motor which prevail—for safety reasons—on other adjustments deriving from the main signal of detection device 4.

For example, when the inclinometer detects an inclination beyond a first threshold (due for example to roughness of the ground), a predominant speed limitation control is issued, regardless of the control which would derive from the detection device signal. If the inclination is detected beyond a second threshold (which indicates for example the full capsizing of the cart), a control of full stop of the motor is issued.

It must be considered that the measurement of the inclination in the travelling direction affects the acceleration and braking controls of the cart. As a matter of fact, if it is detected that the cart is travelling downhill, the control imposes a smaller power use when acceleration is required, because it expects that there is also a gravity acceleration component which cooperates with acceleration. Consequently, again downhill, in case of deceleration, the control uses more braking power.

Figure 1:
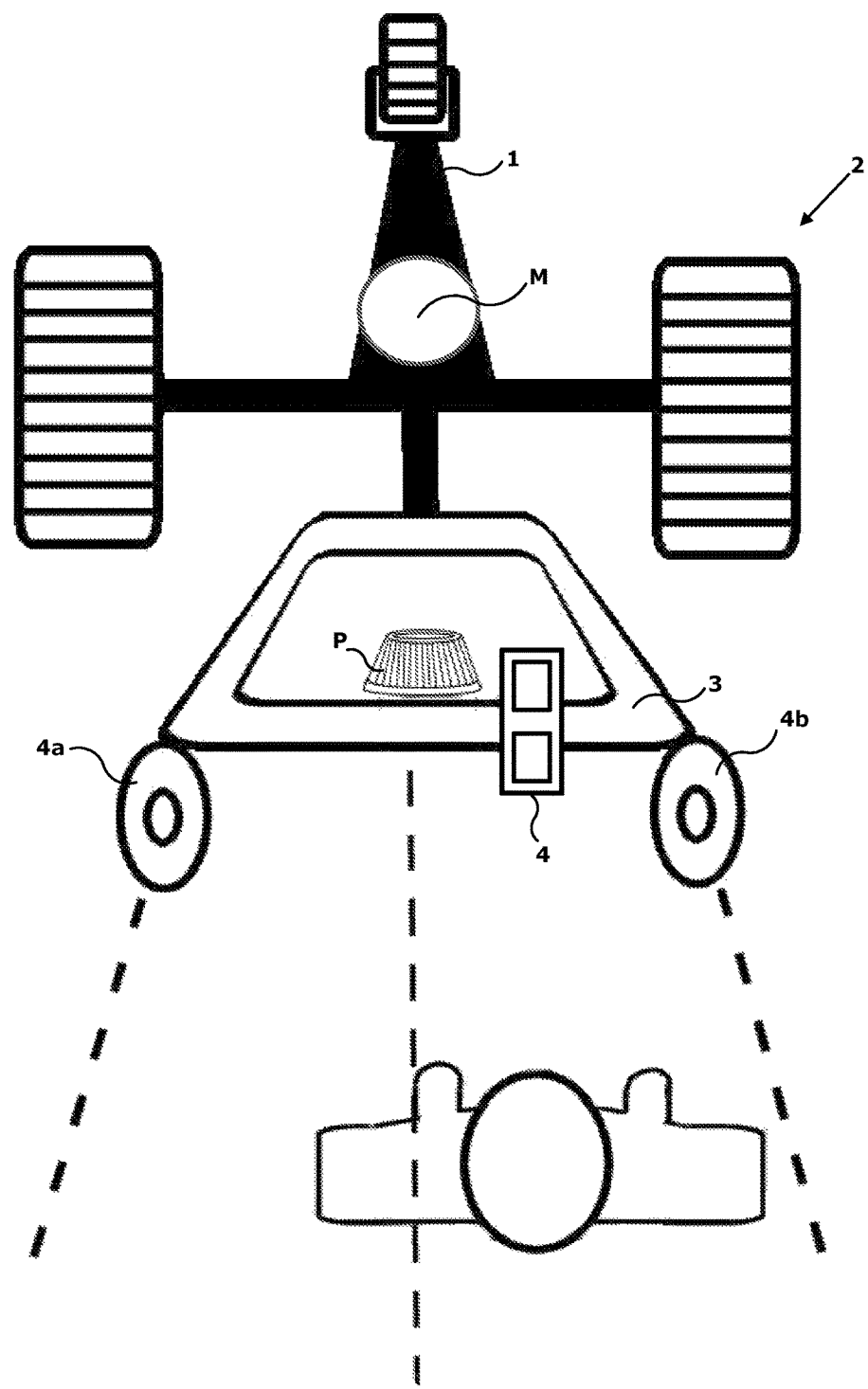
FIG. 1 is a schematic view of a self-moving golf cart provided with the control system according to the invention.
Figure 2:
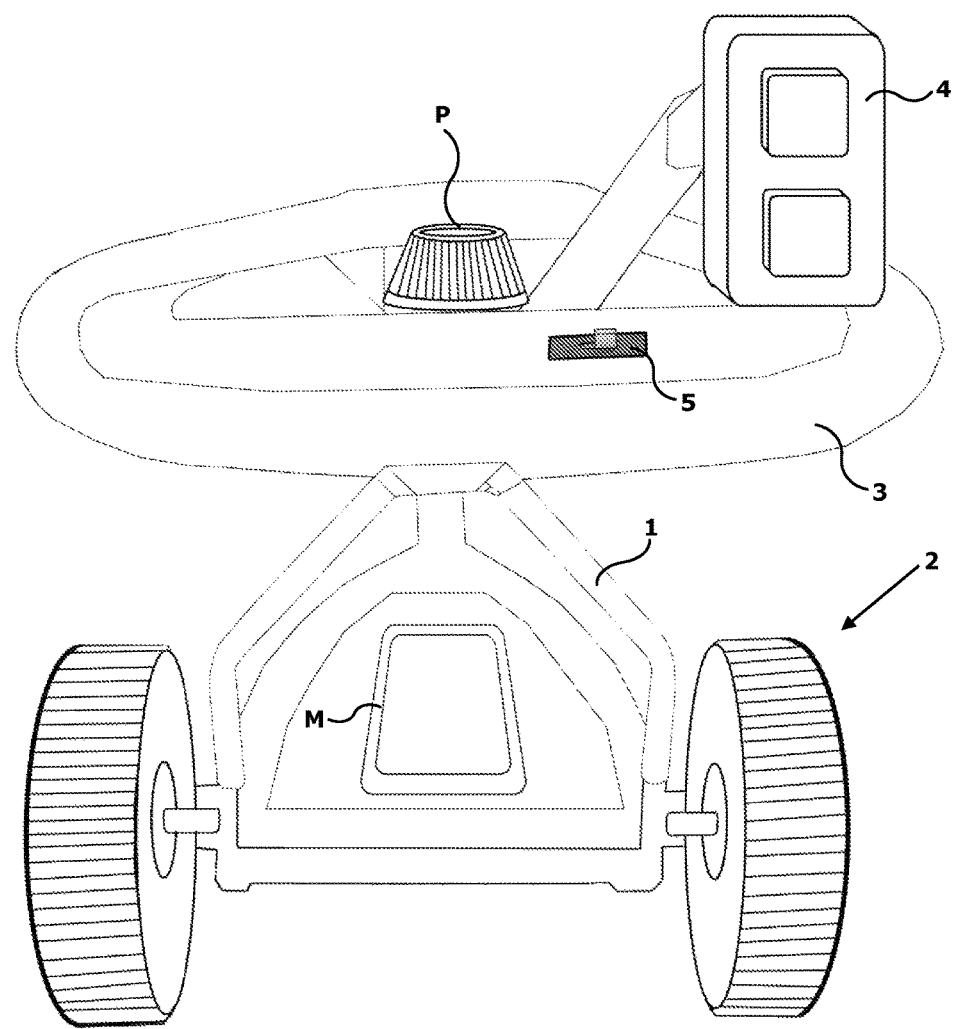
FIG. 2 is a schematic view similar to the one of FIG. 1 according to the user's perspective.

The detection of lateral inclination (on the cart sides) and the inclination of a slope beyond a certain degree, unequivocally indicate that the cart has capsized and in this case the cart is halted. According to a variant, proximity detection device 4 comprises two detectors 4a and 4b, each one provided with a transmitter and a receiver, arranged laterally spaced apart, for example at the two right-hand and left-hand ends of handle 3 (FIG. 1). Thereby it is possible to also determine a player displacement with respect to the centre-line axis of the cart, through a detection of the signal difference between the two detectors 4a and 4b. In order for that to translate into a more advantageous control, the cart too must be able to steer independently, which can easily be obtained through a motor acting independently on the axes of two opposite driving wheels, on the two sides of the cart. For example, it is provided to install two separate electric motors on the two driving wheels, independently controlled by the same logical control unit. Alternatively, at least one directional wheel can be provided (typically the front wheel of a tricycle configuration) controllable through an electro-mechanic mechanism for performing changes of direction which can be governed by the logical unit.

Due to the signal difference between the two detectors 4a and 4b, it can be determined—with automation and control techniques better described further on (FIG. 7)—on which side of the cart the player/user has moved and to consequently control the cart steering. Typically, when both detectors 4a and 4b detect the user's presence, or both detect no presence (that is, the distance possibly detected is beyond the maximum one Dmax), the control is symmetrical and the cart does not change direction. Instead, for example, when one of the two detectors 4a and 4b detects the user's presence while the other does not, the logical unit control acts in the sense of controlling the cart steering and cause it to move in the direction of the detector which does not "detect" the player's presence and the steering continues until both detectors return into an equivalent condition.

Figure 4:
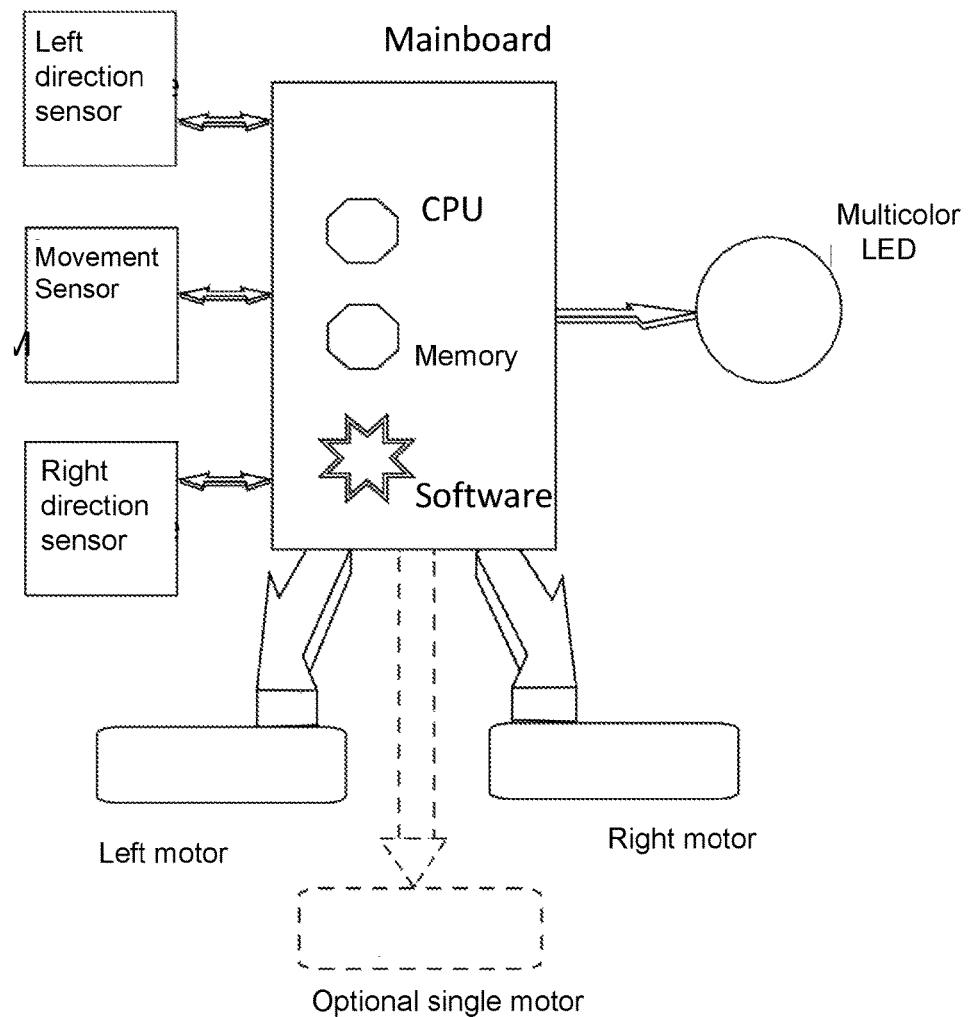
FIG. 4 is a schematic view which illustrates the logical connections of the control system according to the invention.

FIG. 4 reports a general diagram of the logical connections of the system according to the invention.

The logical unit consists of an electronic circuit board (mainboard) provided with a processing unit (CPU), a memory device, for storing some user-set data, the provisional data acquired by the detectors and the actual software which implements the control logic.

To the logical unit, proximity detection device 4 is connected, for example divided into two left and right detectors, as well as possibly a movement sensor which gives an indication of the cart speed (detected on the motor shaft or with respect to the ground, for example with a phonic wheel), an inclinometer and an acceleration sensor. The output channels from the logical unit are instead directed at the only displacement motor—and possibly at the steering control device—or at the two motors acting independently on the two motor shafts of the driving wheels.

The inputs to the logical unit can be of the traditional mechanical/analogical type, or a small display can be provided, possibly of the touch-screen type for entering the necessary settings.

In addition to the system on/off switch, other inputs can be provided for entering user preference or calibration parameters in the logical unit, for example the Dmax and Dmin values, or a sensitivity and starting torque parameter of the control on the motor, or furthermore environmental parameters which allow to change the typical control times based on climate and soil conditions.

Moreover, it is preferable to provide a mode change button, for switching on/off the automatic control and toggle it with a manual control: in this second mode, the user can act on a traditional speed adjuster (potentiometer or buttons with step-like speed increases/decreases) for setting the preferred speed in a constant manner.

In the following some preferred ways of automatic control are described in greater detail, implemented in the logical unit through software programming and numerical analysis.

The main problem to be addressed in the control system according to the invention, in which the user is expected to follow the cart (and not vice versa, as suggested in the prior art), is that of maintaining the cart at an acceptable distance from the following user, so that he/she is not too close to the cart as to risk a collision, but is not too distant as not to be able to reach with his/her hands the on/off button or is unable to manually change cart direction.

In order to reach these goals effectively, it is not sufficient to accelerate when the user is approaching the cart and to brake (or to decrease the speed) when the user is lagging behind (moves away from the cart)—as described instead in the systems identified further above. As a matter of fact, a crucial element is precisely the quantification of the acceleration and of the braking; excessive cart accelerations cause a sudden moving away from the user, which then induce a sharp braking and so on, determining an annoying elastic yo-yo effect or control instability: the cart suddenly moves away from the player, to then brake abruptly hindering the user's walking, who instinctively slows down due to the cart approaching, which then restart again quickly because it senses the person approaching, and so on. This effect of elastic instability largely depends on the cart inertia, which can vary and be heightened by ground conditions, by an uphill or downhill path, by the weight of transported objects, by the type and power of the motor and by the transmission system.

For such purpose, control algorithms are varied and parameterised so as to be used in combination (all, some, or individually) and calibrated to be able to be employed with satisfaction on the largest number of existing carts or which can be conceived especially to operate with the system according to the invention. The control logic according to the invention hence provides:

- increase and decrease of a "basic power" of the motor, which has a typical timing (corresponding to the duration of the recalculation cycle), function of the specific distance range detected between cart and user (for example, off-area distances, distances in the slowing-down area and distances in the acceleration area);
- this typical timing of the change of "basic power" of the motor is also a function of the absolute travelling speed;
- increase and decrease of a "temporary power" which is inversely proportional to the detected distance;
- the increase or decrease of the basic speed and temporary speed are determined as a function of the moving-away or approaching speed of the cart with respect to the user (that is, depending on the derivative of the detected distance);
- an advance start of the motor from a stopped condition is provided, upon detection of an approaching speed (that is the derivative of the distance reduction) above a preset threshold;
- maintenance of a basic power as percentage of the temporary power after a predetermined period of uninterrupted time has elapsed in which the distance lies in a range of "adjacent area";

In the control logic, in particular, one can distinguish between basic power and temporary power. The "basic power" is the power which is capable of maintaining the cart at a constant speed with respect to the user's walking pace; the "basic power" varies gradually to become stable with the user's walking pace; the corresponding changes are calculated cyclically with a minimum time interval every 3 tenths of a second and at most every second, by power increases/decreases in the order of 2% to 5%.

Figure 8:
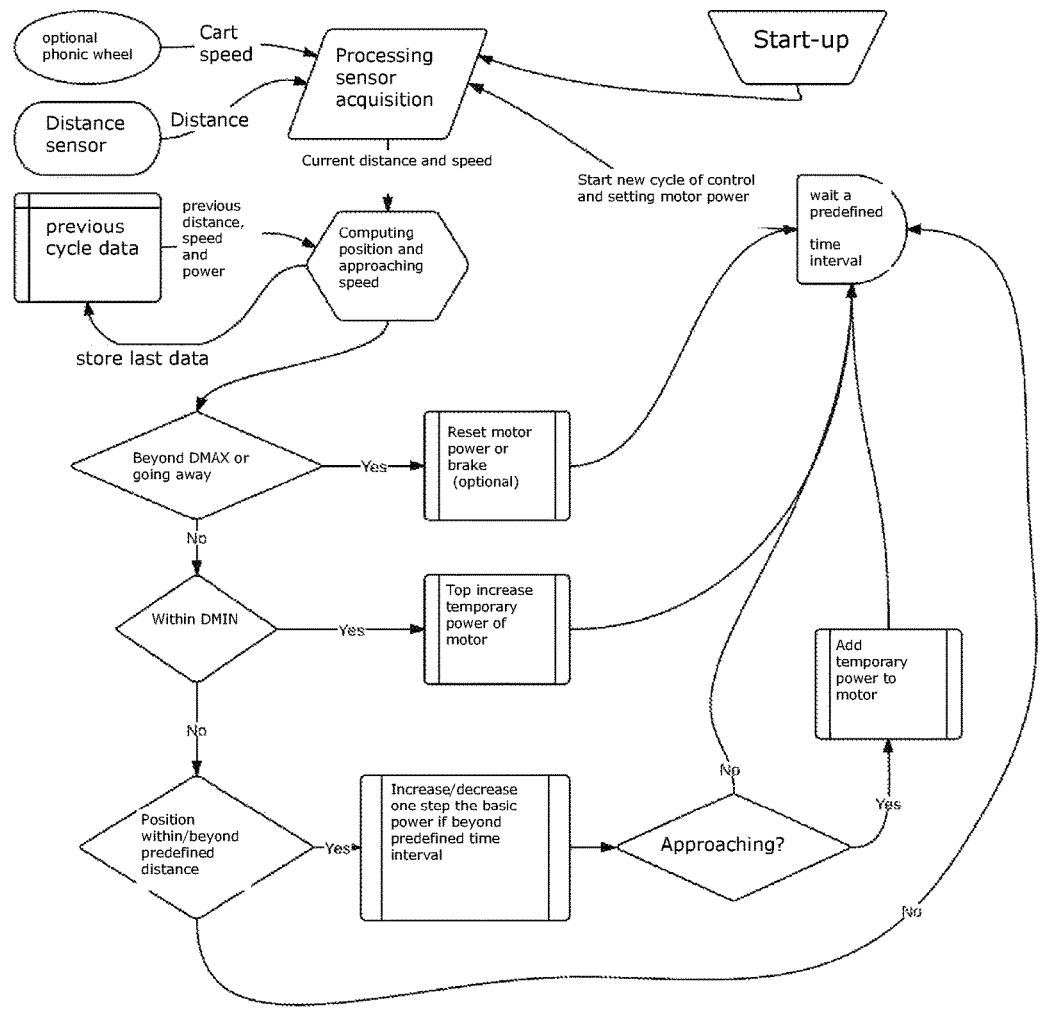
FIG. 8 is a flow diagram of still another portion of the control logic implemented in the system of the invention.

The "temporary power" is a greater power than the basic one, which is instantly requested to the motor when a condition is detected which requires a short acceleration (for example in an approaching phase of the user to the cart, see also FIG. 8), and which is defined as a function of the cart inertia; it has the function of creating the necessary acceleration for increasing very rapid cart speed until reaching that of the user; this temporary power can vary between 10% and 50% of the motor power and, summed with the basic one, is maintained until the cart user is sensed moving away from the cart and typically for periods of time which vary from one tenth of a second to 2 seconds.

In practice, the "basic power" aims at countering movement frictions and therefore varies relatively little between one cruising speed and another; for example, at 4 km/h a motor power of 40% may be required, while at 5 km/h 45% may be needed. Vice versa, to go from a basic speed of 4 km/h to 5 km/h acting only on motor power from 40% to 45%, over 10 seconds would be needed to complete the speed change. Using also "temporary power", an overall (basic+temporary) motor power of 80% can instead be quickly determined—unrelated, per se, to the average speed—for reaching the new speed in less than a second, after which it returns to requiring only a "basic" power of 45% for keeping the new speed constant.

Figure 6:
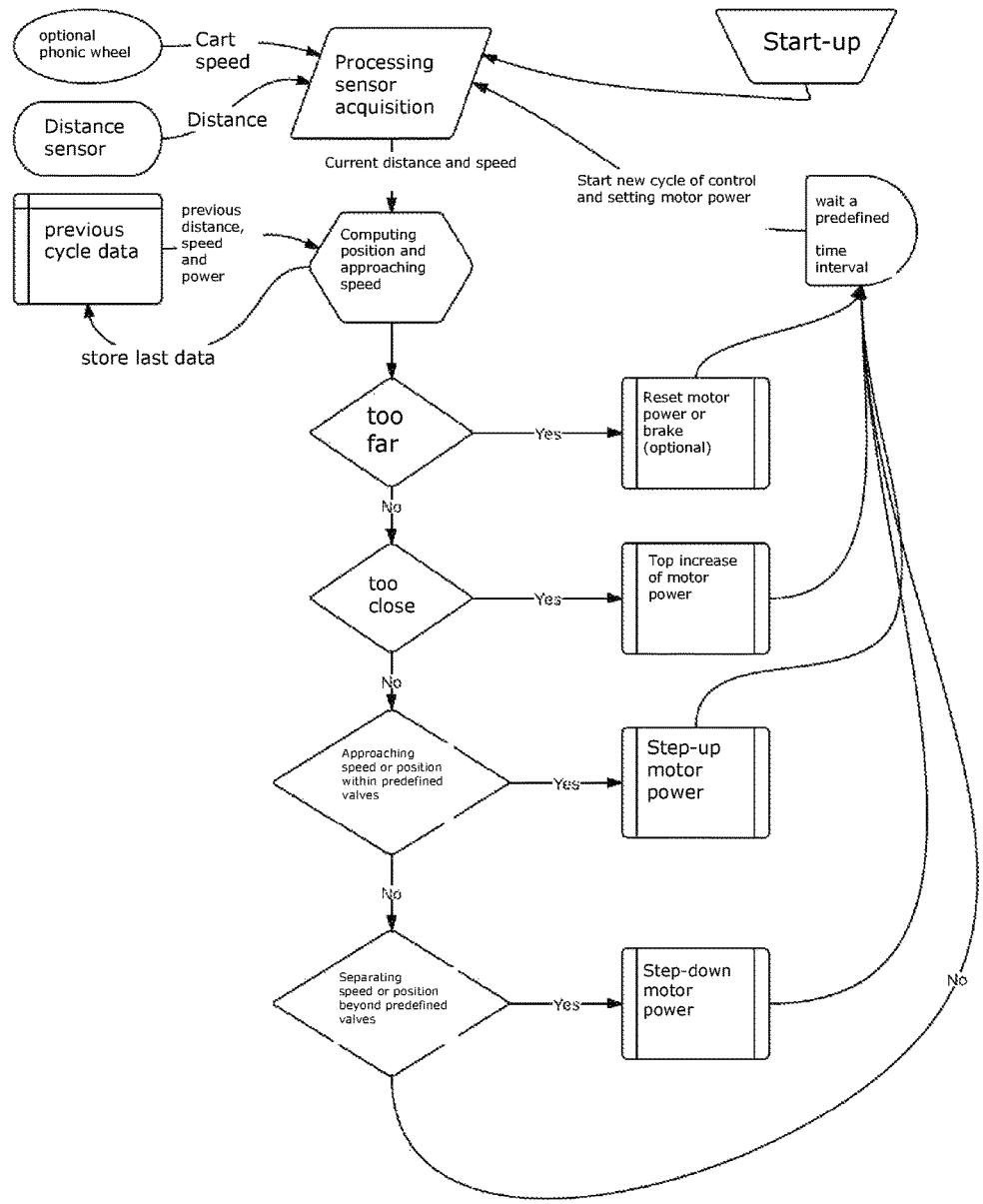
FIG. 6 is a flow diagram of a portion of the control logic implemented in the system of the invention.
Figure 7:
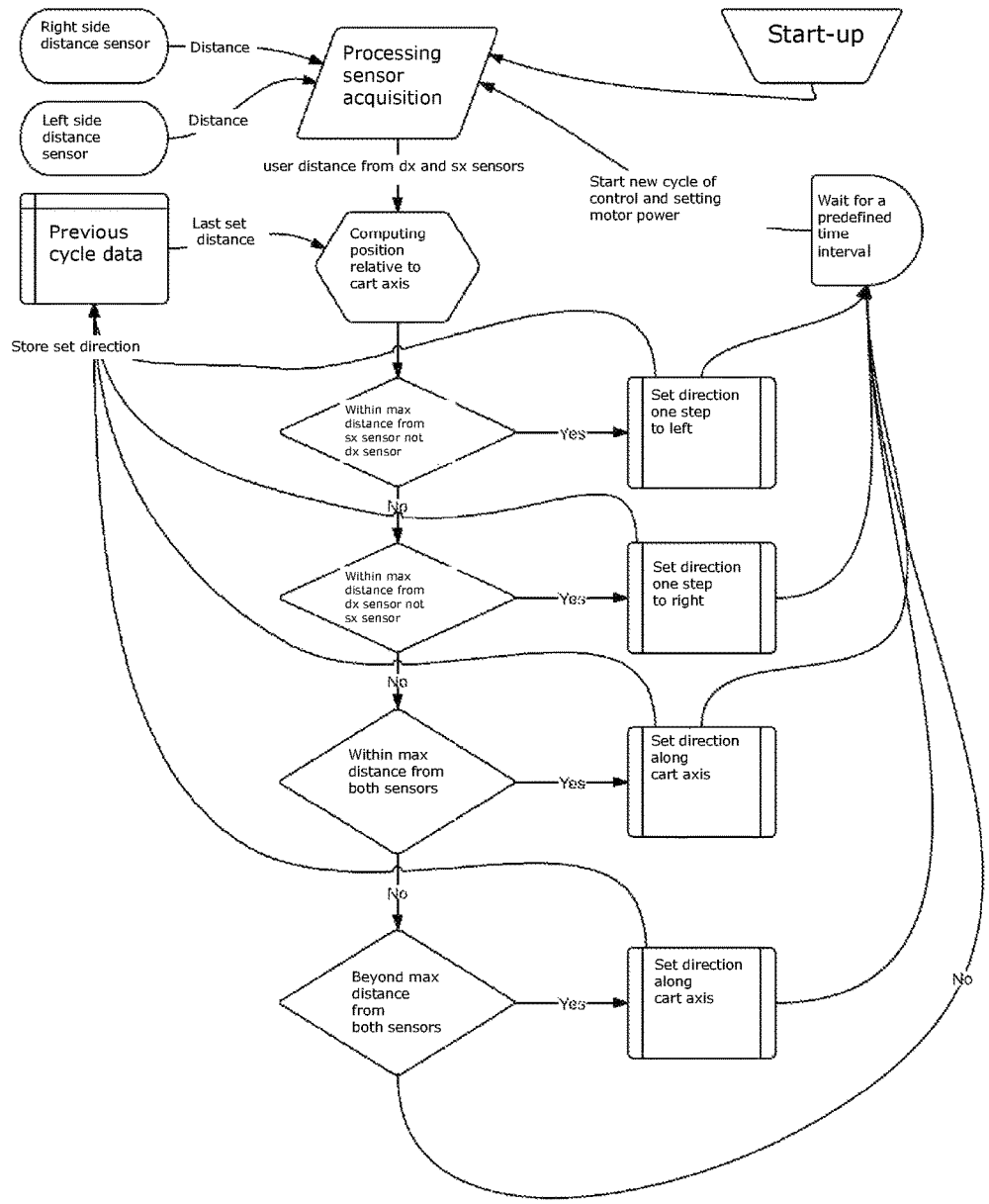
FIG. 7 is a flow diagram of another portion of the control logic implemented in the system of the invention.

FIGS. 6 and 7 show two flow diagrams which illustrate two control logic portions, mutually overlapping and acting in parallel, which implement part of the provisions reported above.

FIG. 6, in particular, shows the control process of the power delivered by the motor, depending on the detected data.

It must be noticed that the logical unit acquires the distance data coming from the proximity sensor, possibly comprising the instant speed data detected by a phonic wheel, for determining the relative distance between cart and user and the speed. These data are stored, at least in a temporary memory, for use in the subsequent cycle. As a matter of fact, in the following calculation step or cycle, through a comparison with the same data stored in the previous calculation cycle, the logical unit is capable of determining one of a plurality of instant conditions of the cart/user distance, that is, if the distance is too wide (too far), if the distance is too short (too close), if one is in an approaching condition or if the distance lies within a preset range and if one is instead moving away or if the distance lies outside the maximum preset distance (Dmax). Based on these conditions, the power to the motor is reduced/reset, increased to the maximum, increased by one step (or by a different number of steps, depending on the motor adjustment features) or decreased by one step, respectively.

Before starting a new calculation cycle and the consequent correction actuation on the motor power, the process waits for a predefined time interval, which makes up a typical system timing, to cause the entire cycle (including a break interval) to have a typical duration of about 60 ms.

Once the waiting time has ended, a calculation and actuation cycle is performed again.

FIG. 7 shows a fully similar flow diagram, in which another portion of control algorithm used in case the cart is provided with suitable steering means is reported, such as an independent motor on two opposite axes of the driving wheels or an electromechanical steering, and a corresponding proximity detection device with two detectors.

In such flow the data coming from the two distance detectors are acquired, on the two right-hand and left-hand sides. This process, like the one described with reference to FIG. 6, also provides an acquisition, temporary storage and calculation step. In the calculation step, also through the comparison against the condition stored in the previous cycle, a series of distance conditions of the user from the two detectors is defined.

It is evident from the description reported in the flow diagram of FIG. 7 that the actuation of the control of the steering means depends on the detection difference between the two distance detectors.

According to a preferred embodiment of the invention, the proximity detector device furthermore provides that each detector simultaneously has two different-kind sensors, in particular an ultrasound one and an infrared one. This configuration allows to have simultaneous, different-kind measurement signals, which may be combined to obtain a mutual correction. Thereby, even resorting to reasonably-priced sensors, a reliable and smooth control can be obtained.

The two sensors are mounted as mutually close as possible, so that they are always both at the same distance from the player. Moreover, since the sensitivity and the reaction of the two sensors may differ, they are suitably calibrated so as to supply a signal of the distance measurement substantially equal (with a tolerance of a couple of cm) at an average distance between the cart and the user (for example, for golf players, in the range of 20-30 cm) in standard controlled conditions (typically without wind, without direct sunlight into the sensors, without dust, at a temperature of 20° C. and with no noise).

The control mode with two different-kind sensors is implemented for the purpose of achieving the highest level of safety and reliability, movement smoothness and at the same time suitable reactivity.

Firstly, for safety reasons, it must be avoided that there is a consent to the starting of the cart when it is not desired: the cart must start only if the player is behind and at the appropriate distance from the cart. For such reason, the control acts on the motor drive only if both sensors detect for at least two consecutive readings (that is, on two calculation cycles of the data processing procedure) that (i) a user is within a certain average distance (20-30 cm), (ii) the distances detected by the two sensors lie within a certain maximum tolerance (5 cm) and (iii) the last measurement detection with respect to the previous one must be plausible, that is, it has a difference with respect to the previous one which falls within a preset acceptability range (for example the player's speed must be lower than 7 km/h). That safely saves from incorrect distance detections, for example due to sunlight/hits or to special weather conditions, which give incorrect and implausible random results.

In particular, if the cart is started when an object lies at a shorter distance (for example 10 cm) than the average distance from the sensors, the cart does not start: that prevents the cart from having consent to start when an object has been left hanging from the handle in front of the sensors by mistake.

The possibility that both different-kind sensors, give consistent incorrect signals—and hence do not mutually compensate—is extremely remote: should it happen, it would be a very rare event which may cause an incorrect control lasting a single calculation cycle (6 hundredths of a second) which would give no unpleasant effect.

In the context of this description, the term "plausible measurement value" means that it falls within a predetermined range of values with respect to the last value considered valid by the system; the term "consistent measurement value" means that it has the same sign and a modulus substantially equivalent to a reference value.

Moreover, in order to privilege control smoothness (that is, to avoid large variations between subsequent detections and consequent controls) during a regime movement, it is provided that—when both sensors detect a plausible distance (not beyond the player's 8 km/h)—the signal of only one of the two sensors is used (typically the IR one which is more precise and less subject to wind and background noise and, in travelling conditions, is well shielded by the user and can hardly be saturated by sunlight). Should it happen that this sensor gives a mistake (it times out or supplies an implausible signal), the measurement detected by the other sensor is used if plausible with the conditions of the previous cycle, otherwise the measurement detected in the previous cycle for a certain number of calculation cycles is simply used until a plausible detection condition by one of the two sensors is restored. Should the anomalous condition persist (both sensors give mistakes or implausible readings) beyond a preset limit number of calculation cycles, the calculation process performs such a control as to define progressively farther plausible (cart-user) distances, which possibly lead the cart to smoothly stop within an acceptable time interval, for example 2-3 seconds. In practice, if both sensors for a second detect no distances or implausible distance, the system continues to work without abrupt interruptions and finally, if the detection of consistent or plausible measurements does not resume, the system begins to slow down the motor until stopping it completely.

From a practical point of view, it has been realised that IR sensors can supply some occasionally incorrect measurement due to reflected sunlight/light shock or due to the flapping of loose garments, but not for continues periods of time beyond 2 or 3 tenths of a second. Ultrasound sensors give errors up to 50% when sound-absorbing materials are weared, but also in this case errors do not persist beyond 6 or 7 tenths of a second. The likelihood that both sensors simultaneously give errors for beyond one second is extremely remote; beyond 2 seconds it is statistically impossible. Hence the control system manages to operate in a smooth and safe manner.

In addition to this basic operation, it is provided to arrange additional controls to customise cart behaviour to the user's requirements.

In order to take into account people's different height, a customised adjustment to the average distance parameter is provided: thereby the user can set the average distance at which to keep the cart, within an admissible range, for example of 10-30 cm.

In order to obtain a suitable cart reactivity to starting, despite the smooth control at normal speed, a customised adjustment to an initial acceleration parameter is provided. As a matter of fact, people who accelerate slowly are frightened if the cart jerks forward, hence they may prefer a low initial acceleration setting, for a smooth start; those who prefer a faster start can set a high initial acceleration value.

In order to take into account the requirement of stopping the cart in the conditions in which the user grabs the handle—otherwise, at a constant distance, the cart control would continue nevertheless to impart a travelling control—in the control process a condition is provided in which, when a constant reduced distance is detected (a sign that the user is insistently "chasing" the cart) for a time above a control threshold, for example of 2 seconds, a halt control is issued.

As can be understood from the above-reported description, the control system of the invention, and the self-moving cart on which such system is installed, allow to perfectly achieve the objects set forth in the preliminary remarks.

As a matter of fact, due to the configuration of the proximity sensor which reads behind the cart the distance from the user, it is possible to obtain an effective control, reliable and without the risks related to the tracking or remote-control techniques of the prior art. Advantageously, the system of the invention also enables the user to remain attached to the cart handle, so as to exploit a dragging effect on difficult terrains. The proximity between cart and user leaves a certain degree of confidence in the user, who is under the impression of keeping more control and hence makes the system of the invention more acceptable and intuitive. The proximity to the cart and the absence of a fully independent movement do not intellectually engage the player, who thus remains concentrated on his/her game and is able to act more instinctively on guiding the cart.

In substance, with the system of the invention, a user is able to cause the cart to move at the desired speed and possibly in the desired direction, without necessarily having to apply any effort on the cart, without having to wear any specific transmitter or other object, but simply walking at the desired speed and in the desired direction, behind the motorised cart as one would normally and intuitively do with non-motorised carts or with manually-actuated ones. As a matter of fact, the entire proximity sensor is installed onboard the cart and no remote component is necessary for the system.

Over the prior-art systems, with the invention it is possible to advantageously obtain:

a more effective reaction to the player's speed changes (due to the specific control, it is avoided to trigger an annoying elastic oscillation around the player's walking speed, managing to regularise normal speed at most in two seconds);

a high level of safety, since it cannot happen that the cart starts uncontrolledly, saturated by sunlight or deceived by other objects;

movement smoothness, because the cart manages to follow the player's speed with no sudden acceleration change;

it can be advantageously applied to existing motorised carts or it can be integrated in newly-manufactured carts.

However, it is understood that the invention is not limited to the particular embodiments illustrated above, which represent only non-limiting examples of the scope of the invention, but that a number of variants are possible, all within the reach of a person skilled in the field, without departing from the scope of the invention as defined in the attached claims.

For example, it is not ruled out that the proximity detector device employs a laser sensor, which tends to be less subject to reading errors typical of ultrasound or infrared sensors.

Furthermore, although reference has always been made to an electric motor, which is certainly the most easily adjustable one, it is not ruled out that the system of the invention may work also on a self-moving cart with a motor of a different type (for example with a combustion engine), provided suitable driving controls are correspondingly defined (for example acting on the adjustment of an injector, instead of on the power drained by the electric motor).

The invention claimed is:

1. Control apparatus for a self-moving cart, comprising at least a speed control of a motor (M) onboard the cart and a logical control unit which adjusts said speed control of said motor (M) based on a relative position of a reference user, furthermore comprising a proximity detector device (4) facing towards the rear side of the cart, with respect to the travelling direction, so as to detect a relative distance with respect to a user following the cart, said logical control unit being configured to determine said speed control as a function of said detected relative distance so that it is kept within a tolerance range defined by a maximum distance (Dmax) and a minimum distance (Dmin), wherein said minimum distance (Dmin) is such as to enable the user to operatively reach on/off means (5) of said apparatus meant to be installed onboard said cart, characterised in that said logical control unit controls said motor acting on increase and decrease of a "basic power" of the motor, in a typical time which is a function of said detected relative distance and function of the absolute travelling speed, increase and decrease of a "temporary power" which is inversely proportional to said detected relative distance, said basic power being of a value of the magnitude order of the power drained by the cart movement frictions, while said temporary power being of the magnitude order of the power drained by the cart acceleration inertia forces.

2. Control apparatus as claimed in claim 1, wherein said logical control unit controls said motor so as to maintain said basic power as percentage of the temporary power after a preset continuous period of time has elapsed in which said detected relative distance lies in a "adjacent area" range.

3. Apparatus as claimed in claim 1, wherein changes of said increases/decreases are calculated cyclically with a minimum timing range of 3 tenths of a second and at most of 1 second and are in the order of 2% to 5%.

4. Apparatus as claimed in claim 1, wherein said proximity detector device (4) has at least a detector provided with two different-kind sensors, arranged at a short distance and calibrated so as to issue substantially equal detected relative distance signals in an average distance condition between the cart and a user, the signals of said two sensors being compared by said logical control unit to check the consistency thereof at least in the apparatus starting step.

5. Apparatus as claimed in claim 4, wherein said control unit controls said motor upon the start of said apparatus only if both said two sensors detect for at least two consecutive calculation cycles that (i) said detected relative distance lies in the range of an average distance, (ii) the signals detected by the two sensors supply measurements within a certain maximum tolerance and (iii) the last relative distance detection measurement has a difference with respect to the previous one which falls within a preset acceptability range.

6. Apparatus as claimed in claim 4, wherein during regime movement, said control unit performs the control action as a function of only the signal of a first one of said two sensors, provided the signals of said two sensors are consistent and plausible, while, if the signal of the first sensor is erroneous, it performs a control action as a function of the signal of said second sensor, provided it is plausible with the signal at the previous cycle.

7. Apparatus as claimed in claim 4, wherein said two sensors are an ultrasound one and an infrared or laser one.

8. Apparatus as claimed in claim 1, wherein said proximity detector device (4) has a single distance detector measuring along a single detection axis.

9. Apparatus as claimed in 8, wherein said proximity detection device (4) has two distance detectors (4a, 4b) measuring along two distinct detection axes and arranged at a distance on a transversal direction with respect to a travelling direction.

10. Apparatus as claimed in 9, wherein steering means are furthermore provided, controlled by said logical control unit depending on the difference between the signals detected by said two distance detectors (4a, 4b).

11. Apparatus as claimed in 10, wherein said steering means are embedded in said motor (M) which has two independent transmission axes for two opposite driving wheels (2).

12. Apparatus as claimed in claim 1, wherein
an inclinometer is furthermore provided, which provides an inclination value to said logical control unit, said unit defining the control of said motor on the basis of a map of reference values which comprise said detected relative distance and said inclination value.

13. Self-moving golf caddy, comprising at least a support frame (1), an assembly of a tricycle or quadricycle (2) at least partly driving wheels, a motor (M) to drive said driving wheels and a control apparatus for adjusting the control of said motor as a function of the relative position between said caddy and a user, characterised in that said control apparatus is as in any one of the preceding claims.

* * * * *